United States Patent [19]
Arnedo et al.

[11] Patent Number: 5,918,532
[45] Date of Patent: Jul. 6, 1999

[54] TOASTER

[75] Inventors: Julian Arnedo; Antonio San Juan Basora, both of Barcelone, Spain

[73] Assignee: Moulinex S.A., Paris, France

[21] Appl. No.: 09/121,899

[22] Filed: Jul. 24, 1998

[30] Foreign Application Priority Data

Jul. 21, 1997 [FR] France .................................. 97/09682

[51] Int. Cl.⁶ .............................. A47J 37/08; H05B 1/02
[52] U.S. Cl. ..................... 99/327; 99/329 P; 99/329 RT; 99/331; 99/389; 99/391; 219/492; 219/521
[58] Field of Search ............................. 99/389–391, 385, 99/393, 326–333, 396, 400–402; 219/492, 494, 506, 411, 413, 481, 489, 521, 525, 528; 396/365, 373

[56] References Cited

U.S. PATENT DOCUMENTS 4,972,768  11/1990  Basora San Juan ...................... 99/391
5,121,678   6/1992  Del Fresno ........................... 99/393 X
5,181,455   1/1993  Masel et al. .......................... 99/401 X
5,423,246   6/1995  McNair et al. ............................ 99/334
5,487,328   1/1996  Fujii ....................................... 99/390
5,642,657   7/1997  Yeung et al. ............................. 99/334
5,664,481   9/1997  Huggler ................................... 99/328
5,771,780   6/1998  Basora et al. ............................ 99/327

*Primary Examiner*—Timothy F. Simone
*Attorney, Agent, or Firm*—Young & Thompson

[57] ABSTRACT

A toaster comprises a housing (1) enclosing a carriage (4) movable between an ejection position and a toasting position to which it can be brought by a handle (6) connected to one end (7) of the carriage (4) by a driver (8) secured to a finger (11) adapted to actuate a control switch (12) for the electrical supply of a heater (3). The driver (8) is movably mounted on the end (7) of the carriage (4) for movement along a vertical path (l) so as to permit the finger (11) to free the switch (12) when the carriage remains blocked in its toasting position after unlocking a retaining device (10).

5 Claims, 3 Drawing Sheets

FIG_2

TOASTER

This application corresponds to French application 97/09682 of Jul. 24, 1997, the disclosure of which is incorporated herein by reference.

FIELD OF THE INVENTION

The present invention relates to a toaster comprising a housing enclosing a toasting chamber provided with heating means and in which is movably mounted in a vertical direction a bread-carrying carriage, between a position for ejecting the bread and a toasting position to which it can be brought against the force of a return spring by a handle movably vertically mounted on the housing and connected to one end of the carriage by a drive adapted to be secured to an unlockable retaining device disposed in the lower region of the chamber and secured to a finger adapted to actuate a limit switch which controls the electrical supply of the heating means.

BACKGROUND OF THE INVENTION

There have been described for example in French patent No. 2,645,424, filed Apr. 7, 1989 by the applicant, toasters of this type.

A typical test of quality and endurance administered by the applicant to such toasters have permitted observing malfunction of certain ones of them under certain circumstances such as blocking the bread-carrying carriage in the toasting position and disabling the internal safety device. These two misfunctions give rise, by continuous operation of the limit switch, to the continuous supply at full power of the heating means and hence the carbonization of the bread slice introduced, with the creation of smoke. If the experiment is carried to the extreme, this slice of bread will become carbonized, producing flames thereby giving rise to the destruction of the apparatus.

The invention seeks to overcome these drawbacks and to provide a toaster of extreme safety of operation.

SUMMARY OF THE INVENTION

According to the invention, the driver is movably mounted on the end of the carriage for a vertical path of movement to come to occupy a safety position, so as to permit the finger to free the switch when the carriage remained blocked in the toasting position after unlocking the retaining device.

As a result, thanks to this freedom of movement obtained by a slack connection permitting vertical movement of the driver, the actuating finger frees the switch no matter what the cause of blockage of the carriage in its toasting position, thereby avoiding the drawbacks mentioned above.

BRIEF DESCRIPTION OF THE DRAWINGS

The characteristics and advantages of the invention will become apparent from the following description, given by way of non-limiting example, with reference to the accompanying drawings, in which.

DETAILED DESCRIPTION OF THE INVENTION

Figure 1:
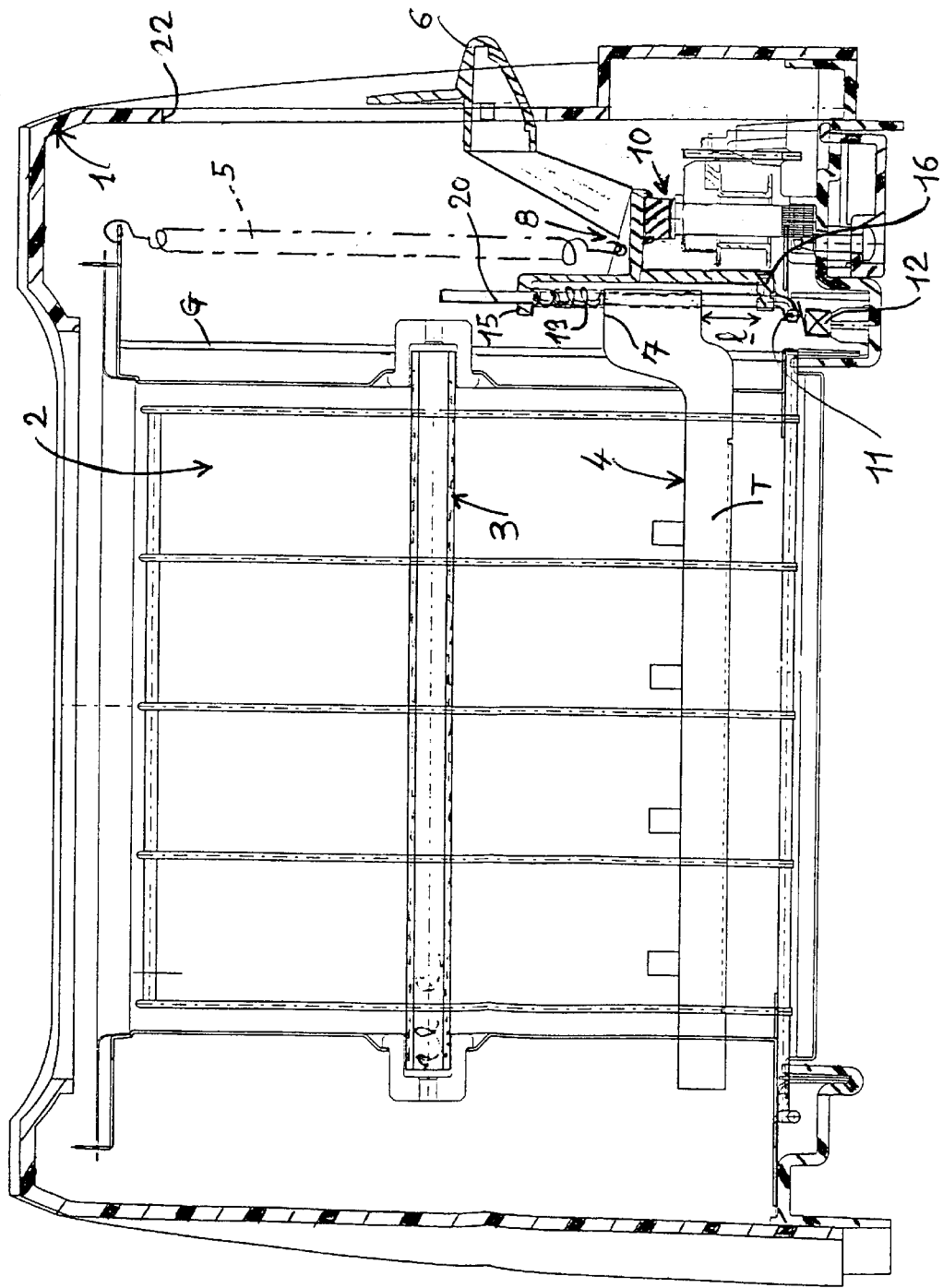
FIG. 1 is a vertical cross section of a toaster according to the invention with a bread-carrying carriage in the toasting position.

As shown in FIG. 1, the toaster comprises a housing 1 enclosing a toasting chamber 2 open at its upper part to permit introduction of a foodstuff such as a slice of bread and provided with heating means 3 comprised, for example, by two quartz heating tubes disposed symmetrically relative to a medial vertical plane of the housing.

Figure 2:
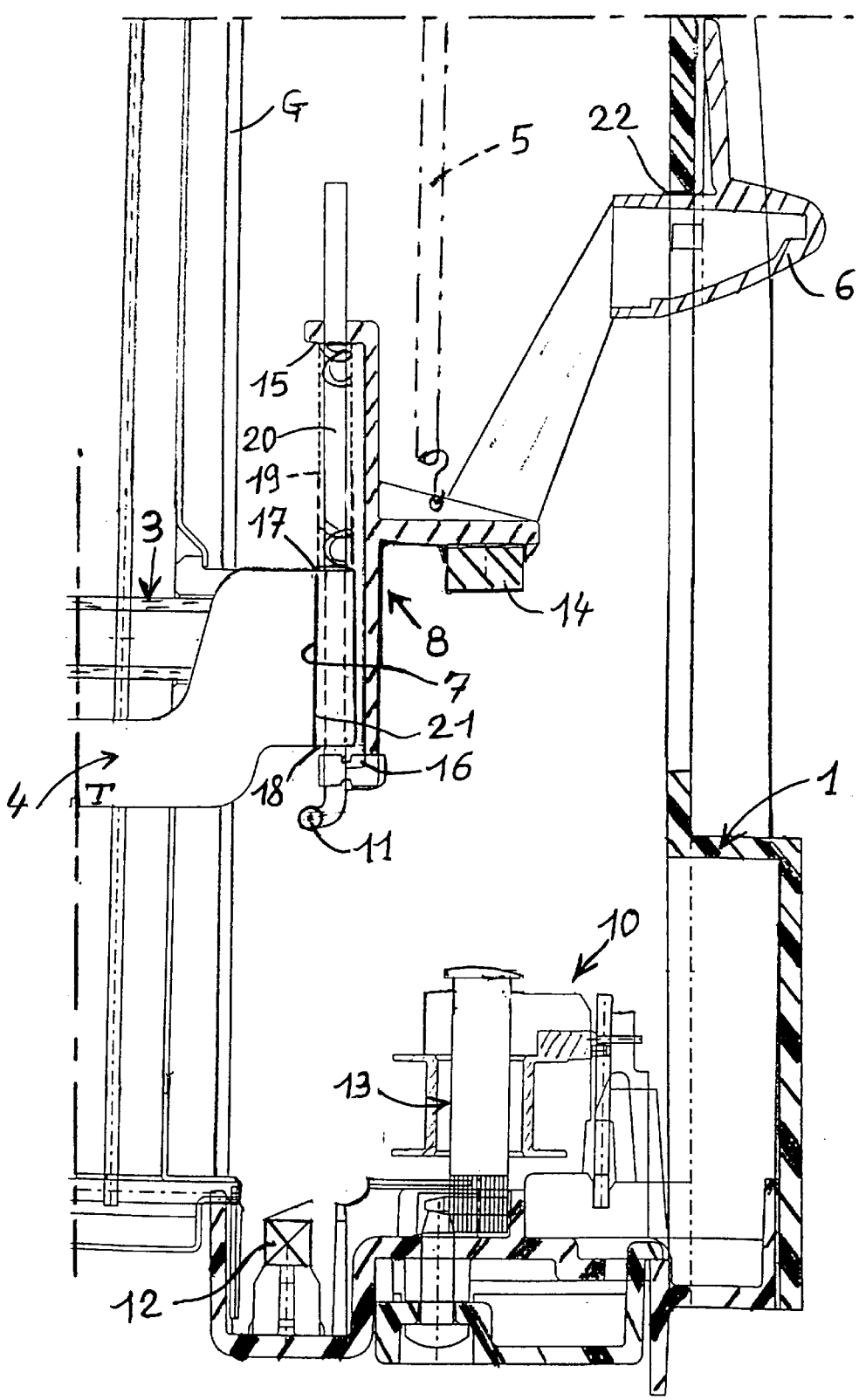
FIG. 2 is an enlarged fragmentary view of the toaster showing a driver according to the invention connecting a handle to the carriage, said carriage being in the ejection position.

In this chamber 2 is movably mounted, in a vertical direction on a slideway schematically shown at G, a bread-carrying carriage 4 comprising a cross piece T extending horizontally and having one end 7 connected to a handle 6 also movably vertically mounted on the housing. Said carriage 4 is thus movably mounted between a position for ejecting the bread (FIG. 2) and a toasting position (FIG. 1) to which it can be brought against the force of a return spring 5 by the handle 6; the mechanical connection between the handle 6 and the end 7 of the carriage being effected by a driver 8. This driver 8 is adapted also to become fixed on an unlockable retaining device 10 by a device for controlling the degree of toasting of the slice of bread, and disposed in a lower region of the chamber 2. This driver 8 is secured to a finger 11 adapted to actuate a limit switch, schematically shown at 12, which controls the electrical supply of the heating means 3.

In the embodiment shown, the retaining device 10 comprises an electromagnet 13 secured to the housing 1, whose movable armature 14 is secured to the driver 8. Such a device is for example described in French patent application No. 2,740,317 of the applicant. As to the switch 12, it can be of the quick breaking type and can comprise a movable actuating lever of a movable contact relative to a fixed contact, such that said lever by its displacement controls the rapid opening or closing of the contacts.

According to the invention, the driver 8 is movably mounted on the end 7 of the carriage 4 along a predetermined vertical path l to come to occupy a safety position, so as to permit the finger 11 to free the switch 12 when the carriage remains blocked in toasting position after unlocking of the retaining device 10. This freeing of the switch corresponds to opening the contacts and hence interruption of the electrical supply of the heating means 3.

According to a preferred embodiment of the invention, and as shown in the drawings, the driver 8 has the shape of a fork with two horizontal branches forming respectively upper 15 and lower 16 drive members located on opposite sides of the end 7 of the carriage 4, spaced in a vertical direction and providing said vertical path l, and adapted to come into engagement alternately and respectively with two upper 17 and lower 18 abutments arranged on said end 7.

So as to minimize mechanical play between the different pieces whilst ensuring their correct positioning, the fork comprises between its branches a vertical guide rod 20 on which is slidably mounted the end 7 of the carriage 4. To this end, the end 7 has a rolled edge 21 forming a sleeve and sliding bearing on the rod 20. Moreover, the lower end of this rod carries the finger 11.

Of course, the drive 8 could be differently embodied, by forming for example of one piece secured to the handle 6 an oblong vertical hole having an axial length equal at least to the path l and constituting by its ends the drive members 15, 16, and in the end 7 of the carriage 4 a transverse cog so as to penetrate said hole thereby permitting the vertical displacement of the member along the path 1 relative to said cog.

According to another characteristic of the invention, a compression spring 19 is arranged between the upper drive member 15 and the upper abutment 17. This spring 19 is preferably threaded on the guide rod 20, and permits obtaining particularly the flexible connection and shock absorption between the different pieces.

The operation of the toaster will now be described, supposing that the user has already pressed the handle 6 downward, the bread-carrying carriage 4 being in its position shown in FIG. 1.

In this position, the driver is retained by electromagnet 13 and the upper drive member 15 is in engagement via the spring 19 with the upper abutment 17 of the end 7 of the carriage. The rod 20 and hence the finger 11 actuate the switch 12, which is to say close the contacts and permits supply of the heating means 3.

At the end of the toasting cycle, the electromagnet releases the driver 6 which is returned to the upper region of the housing by the spring 5.

Figure 3:
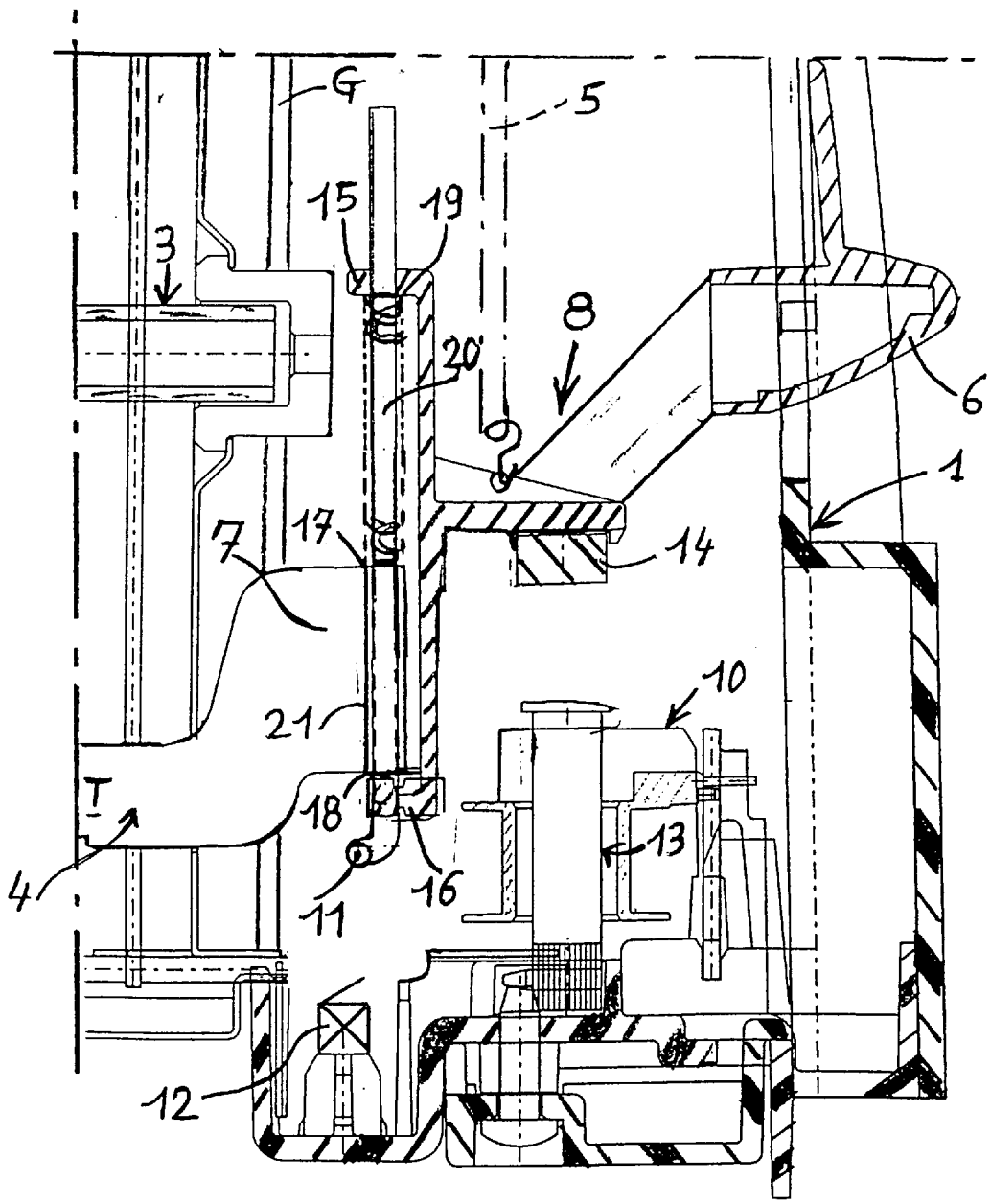
FIG. 3 is a view similar to FIG. 2, but showing the carriage in the toasting position and the driver in the safety position.

In the case in which the carriage 4 remains blocked in the toasting position (FIG. 3) because, for example, of a jamming of a slice of bread in the housing, and thanks to the loose connection between the driver 8 and the end 7, said driver therefore moves upwardly along the path 1 until the lower abutment 18 comes into engagement with the lower drive member 16 and thus comes to occupy its safety position. In the course of this movement, the finger 11 frees the switch 12 and hence cuts the electrical supply of the heating means 3, thereby avoiding any risk associated with abnormal overheating of the chamber.

In addition to this operational safety device connected to the particular embodiment of the driver, the spring 19 plays the role of end-of-movement shock absorber for the bread-carrying carriage 4 when this latter is returned by the return spring 5 and tends to occupy normally its ejection position. Thus, the housing 1 comprising in its upper portion a limit stop 22 for the handle 6, this handle is abruptly stopped and the carriage 4, violently propelled upwardly, continues its movement by inertia, giving rise to the compression of the spring 19 and hence shock absorbing its movement and its return to its normal ejection position.

What is claimed is:

1. In a toaster comprising a housing (1) enclosing a toasting chamber (2) having heating means (3) and in which is movably vertically mounted a bread-carrying carriage (4) between a position for ejecting the bread and a toasting position to which it can be brought against the action of a return spring (5) by a handle (6) movably vertically mounted on the housing and connected to one end (7) of the carriage (4) by a driver (8) adapted to be secured in a releasable retaining position (6) disposed in the lower region of the chamber and secured to a finger (11) adapted to actuate a limit switch (12) which controls the electrical supply of the heating means (3); the improvement wherein the driver (8) is movably mounted on the end (7) of the carriage (4) for movement along a vertical path (l) to a safety position so as to permit the finger (11) to free the switch (12) when the carriage remains blocked in the toasting position after unlocking of the retaining device (10).

2. A toaster according to claim 1, wherein the driver (8) comprises two upper and lower drive members (15) and (16), located on opposite sides of the end (7) of the carriage (4), and spaced apart in a vertical direction, and adapted to come into engagement alternatively and respectively with two upper and lower abutments (17 and 18) arranged on said end (7).

3. A toaster according to claim 2, further comprising a compression spring (19) arranged between the upper drive member (15) and the upper abutment (17).

4. A toaster according to claim 2, wherein the driver has the shape of a fork with two branches forming respectively the upper and lower drive members (15 and 16), and comprising between said branches a vertical guide rod (20) on which is slidably mounted the end (7) of the carriage (4).

5. A toaster according to claim 1, wherein the housing (1) has in its upper portion a stop (22) for the handle (6), the compression spring (19) serving as an end-of-movement shock absorber for the bread-carrying carriage (4) when the carriage (4) is returned by the return spring (5) to its ejection position.

* * * * *